(12) United States Patent
Moreau et al.

(10) Patent No.: US 10,478,926 B2
(45) Date of Patent: Nov. 19, 2019

(54) METHOD FOR ASSEMBLING A COMPOSITE HOUSING FITTED WITH A SHAFT AND ASSOCIATED MOUNTED ELEMENTS

(71) Applicant: Mahle International GmbH, Stuttgart (DE)

(72) Inventors: Mikael M. Moreau, Poissy (FR); Daniel M. Coulaud, Yerres (FR); Frank Dautel, Gerlingen (DE); Roberto Cutrona, Backnang (DE); Antonio Menonna, Ditzingen (DE); Thomas Flender, Eberdingen (DE); Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 1023 days.

(21) Appl. No.: 14/787,762

(22) PCT Filed: Apr. 22, 2014

(86) PCT No.: PCT/EP2014/058123
§ 371 (c)(1),
(2) Date: Oct. 28, 2015

(87) PCT Pub. No.: WO2014/177420
PCT Pub. Date: Nov. 6, 2014

(65) Prior Publication Data
US 2016/0074976 A1    Mar. 17, 2016

(30) Foreign Application Priority Data
Apr. 29, 2013 (EP) .................................. 13165768

(51) Int. Cl.
*B23P 11/00* (2006.01)
*B23P 11/02* (2006.01)
(Continued)

(52) U.S. Cl.
CPC ............. *B23P 11/00* (2013.01); *B23P 11/025* (2013.01); *F01L 1/047* (2013.01); *F01L 1/053* (2013.01);
(Continued)

(58) Field of Classification Search
CPC ..... B23P 11/00; B23P 11/025; B23P 2700/02; F01L 1/047; F01L 2103/01;
(Continued)

(56) References Cited

U.S. PATENT DOCUMENTS

| 4,054,986 A * | 10/1977 | Marres | ..................... B23P 11/00 264/242 |
| 2009/0165297 A1 * | 7/2009 | Mataga | ................... B23P 11/00 29/888.1 |
| 2013/0283613 A1 * | 10/2013 | Walter | ................. B21D 53/845 29/888.06 |

FOREIGN PATENT DOCUMENTS

| DE | 102008064194 A1 | 7/2010 |
| DE | 102009060350 A1 | 6/2011 |

(Continued)

OTHER PUBLICATIONS

English abstract for EP-1155770.
(Continued)

*Primary Examiner* — Bayan Salone
(74) *Attorney, Agent, or Firm* — Fishman Stewart PLLC

(57) ABSTRACT

A method and device for assembling a composite housing fitted with a shaft and at least one associated mounted element are disclosed. The method may include the steps of: arranging the housing in a predetermined position with respect to an actuator; arranging the shaft in a predetermined position with respect to the housing and the actuator; selecting a mounting element to be mounted on the shaft; conveying the mounting element into a predetermined position within the housing; pushing the shaft via the actuator so that
(Continued)

the shaft passes successively through an opening of the housing and an opening of the mounting element; and positioning the mounting element in a position adjacent to a heat source for a predetermined duration after the step of selecting the mounting element and prior to conveying the mounting element.

20 Claims, 9 Drawing Sheets

(51) Int. Cl.
  *F01L 1/04* (2006.01)
  *F16B 4/00* (2006.01)
  *F01L 1/047* (2006.01)
  *F01L 1/053* (2006.01)

(52) U.S. Cl.
  CPC .......... *F16B 4/006* (2013.01); *B23P 2700/02* (2013.01); *F01L 2001/0476* (2013.01); *F01L 2103/01* (2013.01)

(58) Field of Classification Search
  CPC ... F01L 2001/0476; F01L 1/053; F16B 4/006; Y10T 29/49828
  See application file for complete search history.

(56) References Cited

FOREIGN PATENT DOCUMENTS

| DE | 102010045047 A1 | 3/2012 |
| EP | 0892156 A1 | 1/1999 |
| EP | 1155770 A2 | 11/2001 |
| JP | 04334706 | 11/1992 |

OTHER PUBLICATIONS

English abstract for DE-102009060350.
English abstract for DE-102008064194.
English abstract for JP-04334706.

* cited by examiner

METHOD FOR ASSEMBLING A COMPOSITE HOUSING FITTED WITH A SHAFT AND ASSOCIATED MOUNTED ELEMENTS

CROSS-REFERENCE TO RELATED APPLICATIONS

This application claims priority to European Patent Application No. 13165768.6, filed Apr. 29, 2013, and International Patent Application No. PCT/EP2014/058123, filed Apr. 22, 2014, both of which are hereby incorporated by reference in their entirety.

TECHNICAL FIELD

The present invention relates to a method and a device for assembling a composite housing fitted with a shaft and associated mounted elements.

BACKGROUND

In various fields, notably the automotive field, it is necessary to equip a housing with a rotatable shaft on which have been located a number of mounted elements spaced along its length. In order for the shaft to be rotatably located in bearings arranged in the housing, it is necessary for the shaft to be successively driven through each bearing and each mounted element which has previously been located in position along the path of the shaft.

In the case of such an assembly intended for an application in the automotive field, the composite housing can comprise a cylinder head cover of an automotive engine, the mounted elements being cam lobes for the operation of associated valve mechanisms in the engine. In addition, other elements such as balancing masses can be mounted in order to ensure vibration-free rotation of the shaft.

A previously proposed method of assembling a composite housing fitted with a shaft and associated mounted elements is described in document EP 1 155 770 B. In this document, the described assembly process comprises the steps of: arranging the housing in a predetermined position with respect to an actuator, the housing having at least one opening adapted to receive a shaft; arranging the shaft in a predetermined position with respect to the housing and the actuator; selecting an element to be mounted on the shaft within the housing, the element having an opening adapted to receive the shaft; conveying the element into a predetermined position within the housing, and pushing the shaft by means of the actuator so that it passes successively through the opening in the housing and that in the element to be mounted.

This previously proposed method of assembling a composite housing thus involved locating the elements which were to be mounted on the shaft in predetermined positions corresponding to those they would occupy in the assembled housing, locating the housing around the elements to be mounted on the shaft in a predetermined position corresponding to that it would occupy in the completed assembly, and then pushing the shaft through the openings in the walls of the housing and openings in the elements to be mounted on the shaft, which openings are arranged to be aligned when in the predetermined positions.

In order to ensure a tight fit of the elements on the shaft once the assembly process has been completed, the elements can be heated to a predetermined temperature prior to assembly. This causes the opening in each element to expand and thus facilitate the passage of the shaft. Subsequent cooling causes the opening to contract and thus fix the mounted elements in position on the shaft. In this previously proposed method of assembling a composite housing fitted with a shaft and associated mounted elements, each element was located in its predetermined position some time before the shaft was driven into its assembled position in the housing. This feature presented the disadvantage that, if the elements were heated in advance of the assembly process, the time necessary to locate each element in its predetermined position, added to that required to locate the housing in its predetermined position relative to the elements to be mounted on the shaft, meant that the previously heated elements would have cooled before the assembly process began. The passage of the shaft through the openings in the elements to be mounted would thus be hindered, slowing the assembly process and possibly causing miss-alignment of the various components.

SUMMARY

It is therefore an object of the present invention to provide a method and a device for assembling a composite housing fitted with a shaft and associated mounted elements in which the aforementioned disadvantages are overcome.

According to the invention, there is provided a method for assembling a composite housing fitted with a shaft and associated mounted elements which comprises the additional steps of, subsequent to selecting the element to be mounted on the shaft within the housing, and prior to conveying the element into a predetermined position within the housing, holding it in a position adjacent a heat source for a predetermined time; selecting at least one additional element and conveying it into a predetermined position within the housing, said element having an opening adapted to receive the shaft, and, subsequent to selecting the element to be mounted on the shaft within the housing, and prior to conveying the element into a predetermined position within the housing holding it in a position adjacent a heat source for a predetermined time; and pushing the shaft by means of the actuator so that it passes through the opening in the additional element to be mounted.

By ensuring that each element to be mounted is maintained at a high temperature until its location within the housing, the present invention offers the advantage that the operation to drive the shaft into its assembled position is facilitated. Furthermore, the invention ensures that the risks of the mounted elements being miss-aligned in the assembled positions on the shaft are minimized.

Preferably, the selected element is heated up to a predetermined temperature prior conveying it into its predetermined position.

Preferably, the selected element is heated by an induction coil or in a separate oven.

Preferably, the end of shaft is pushed to a predetermined position with respect to the housing after it passes the opening in the last element to be mounted and is held in this position for a predetermined time.

According to a second aspect of the invention, there is provided a device for assembling a composite housing fitted with a shaft and associated mounted elements, the device comprising a support for receiving the housing, the housing having at least one opening adapted to receive a shaft, the device further comprising an actuator for pushing the shaft through said opening, at least one locating tool adapted to select at least one associated element to be mounted on the shaft and convey it to a predetermined position within the housing, the device further comprises at least one additional locating tool adapted to select at least one associated element to be mounted on the shaft characterized in that the at least one additional locating tool is moveable with respect to the at least one other additional locating tool.

Preferably, the locating tools adapted to select an associated element are positioned in a predetermined, non-aligned position relative to each other before conveying the associated elements into their predetermined positions.

Preferably, the device further comprises a heat source associated with the element to be mounted on the shaft, said heat source being arranged at predetermined point relative to the housing.

BRIEF DESCRIPTION OF THE DRAWINGS

The present invention will now be described by way of example with reference to the accompanying drawings, in which.

DETAILED DESCRIPTION

Figure 1:
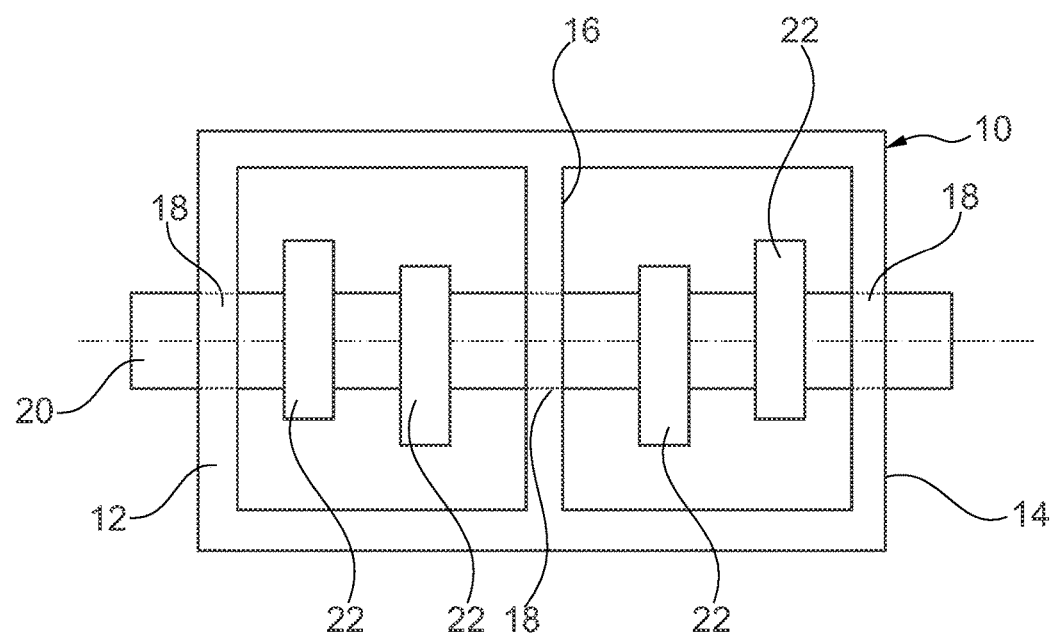
FIG. 1 is a schematic perspective view of a composite housing fitted with a shaft and associated mounted elements, assembled in accordance with the invention.

FIG. 1 shows a composite housing fitted with a shaft and associated mounted elements which has been assembled using the method of assembly according to the invention.

The housing 10 which, in the illustrated example, is the cylinder head cover of an engine of a motor vehicle (not shown), comprises first and second end walls 12, 14 and at least one intermediate wall 16. The housing 10 may alternatively be an open frame adapted to form part of a cylinder head of an engine. Additional intermediate walls 16 may be provided in accordance with the dimensions of the housing. In the example shown, a single intermediate wall is provided, arranged to be generally equidistant from the two end walls 12, 14.

The end walls 12, 14 and the or each intermediate wall 16 are fitted with generally annular bearings 18 which are preferably similar and which are together adapted to receive a shaft 20 as will be described herebelow. The shaft 20 is fitted with mounted elements 22, four in the illustrated example, spaced along its length. In the illustrated example, the mounted elements are cam lobes which, when the housing is mounted upon a vehicle engine and the shaft is caused to rotate, are each adapted to operate an associated valve mechanism (not shown).

The shaft 20 can project beyond the end walls 12, 14 of the housing 10, preferably equidistantly, as shown, or, alternatively, may have its ends flush with the outer surface of the end walls.

Other elements 22 can be mounted on the shaft 20, whether further similar elements to those shown, or additional elements. In the case where the housing is a cylinder head cover of the engine of a motor vehicle the additional elements can comprise balancing masses to ensure vibration-free rotation of the shaft 20, gear wheels, speed wheels, bearing rings, cams intended to operate pumps, or assembly supports.

The method of assembling the composite housing fitted with a shaft and its associated mounted elements which is illustrated in FIG. 1 will now be described with reference to FIGS. 2 to 9.

Figure 2:
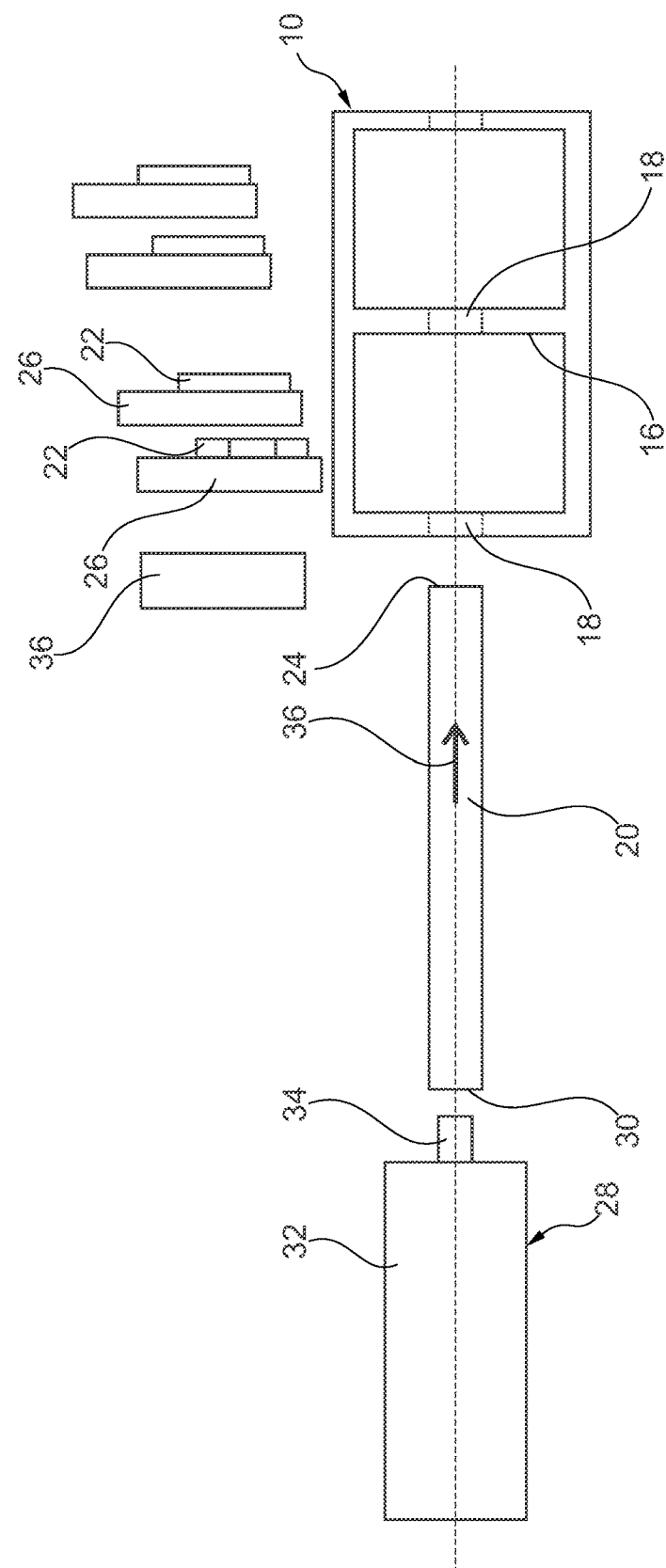
FIGS. 2 to 9 are similar views of the composite housing fitted with a shaft and associated mounted elements at various stages in the assembly process according to the invention.

The first stage of the method of assembling the composite housing fitted with a shaft and its associated mounted elements is shown in FIG. 2. The housing 10 has been located on a support (not shown) and has been fitted with bearings 18 but with no other components. The shaft 20 is located outside the housing, with one end 24 adjacent to the end wall 12 and is arranged coaxially with the bearings 18 and is mounted on supports (not shown) so that it is free to be displaced along the line of its longitudinal axis.

The elements 22 which are to be mounted on the shaft 20 are each taken individually from a supply station (not shown) by an associated locating tool, shown generally 26. Each locating tool 26 is adapted to select a given element 22 to be mounted on the shaft and convey it to a predetermined position within the housing 10 as will be described in greater detail hereafter.

In the course of the method for assembling a composite housing fitted with a shaft and associated mounted elements in accordance with the invention, the shaft 20 will be driven, from its position illustrated in FIG. 2 to that illustrated in FIG. 1, progressively through the three bearings 18 as well as through openings (not shown) in the various elements to be mounted on the shaft as will be described hereafter.

The axial displacement of the shaft 20 is selectively controlled by an actuator 28 which is located adjacent the remote end 30 of the shaft 20. In the illustrated embodiment, the actuator 28 comprises a hydraulic piston and cylinder in which an increase in internal hydraulic pressure in the cylinder 32 causes the piston 34 to extend and engage the remote end 30 of the shaft 20 and force it axially in the direction of arrow 36 towards the housing 10. Other types of actuator 28 could of course be envisaged.

In order to ensure a tight fit of the elements 22 on the shaft 18 once the assembly process has been completed, and in accordance with an aspect of the invention, the elements 22 to be mounted on the shaft 20 are heated to a predetermined temperature prior to assembly and are then maintained at this temperature until they are each conveyed to a predetermined position within the housing 10 by a respective locating tool 26. By maintaining each element at the predetermined temperature until the moment when it is conveyed by the associated locating tool 26 into its position within the housing 10, it is ensured that the passage of the shaft through the opening in each element is facilitated while ensuring that, upon cooling at the end of the assembly process, each such element will contract and become immovably fixed to the shaft. To this end, once each element 22 has been taken individually from a supply station by its associated locating tool 26, it is held in the illustrated ready position adjacent an associated heat source shown generally 36. Additional heat sources, not shown, are provided for each element 22. The or each heat source may comprise an induction coil or a separate oven.

Figure 3:
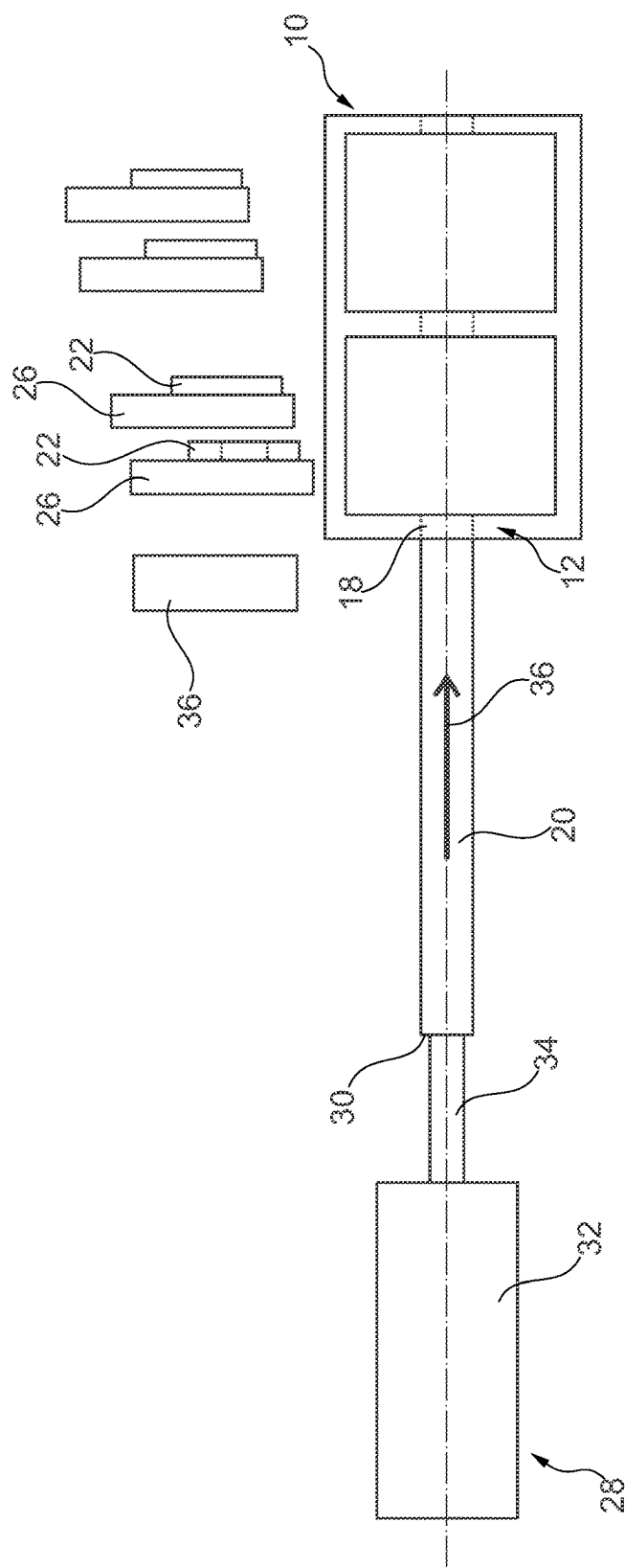

The second stage of the method of assembling the composite housing fitted with a shaft and its associated mounted elements is shown in FIG. 3. The actuator 28 has been operated to displace piston 34 and engage the remote end 30 of the shaft 20 in order to drive it axially in the direction of arrow 36 so that end 24 of the shaft 20 is forced into the bearing 18 mounted in end wall 12. At this point in the assembly process, the locating tools 26 are still in position adjacent their respective heat sources 36, only one of which is shown.

Figure 4:
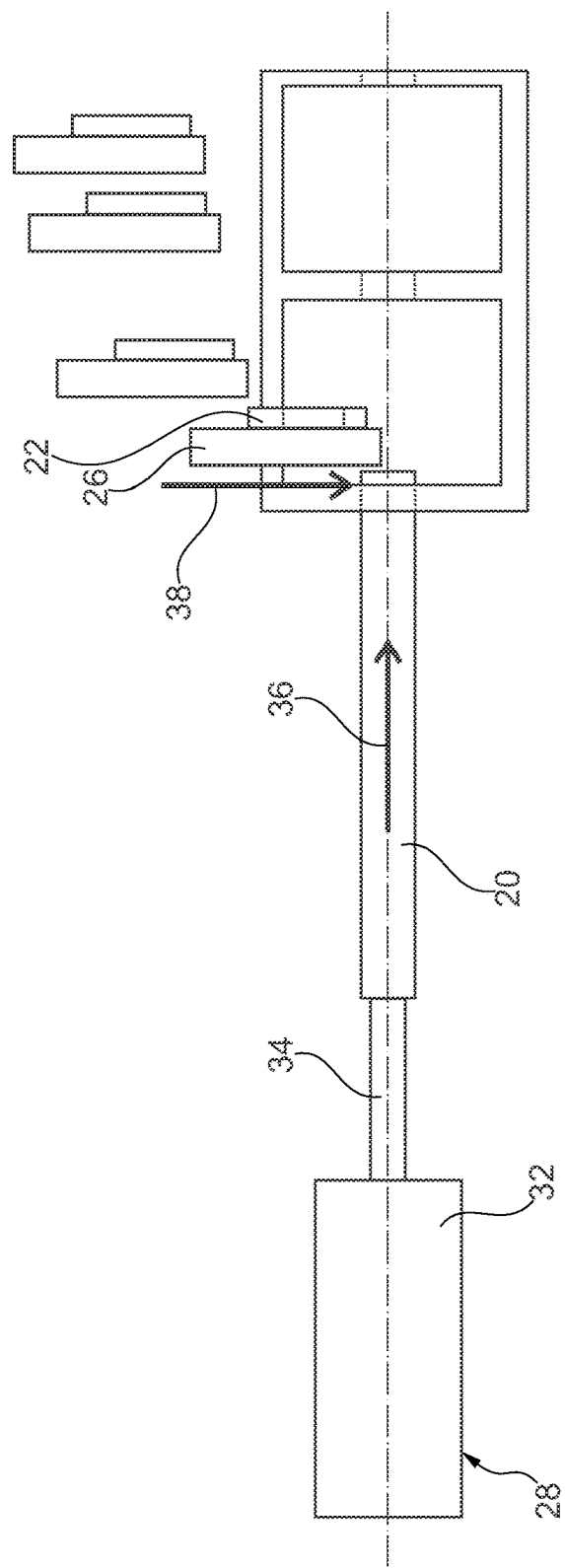

FIG. 4 illustrates the next stage in the method of assembling the composite housing in which actuator 28 has driven the end 24 of shaft 20 through the bearing 18 in end wall 12. At this point, the locating tool 26 associated with the first element 22 to be mounted on the shaft 20 moves it from the ready position of FIG. 3 adjacent its associated heat source 36 in the direction of arrow 38 towards a predetermined position within the housing 10.

Figure 5:
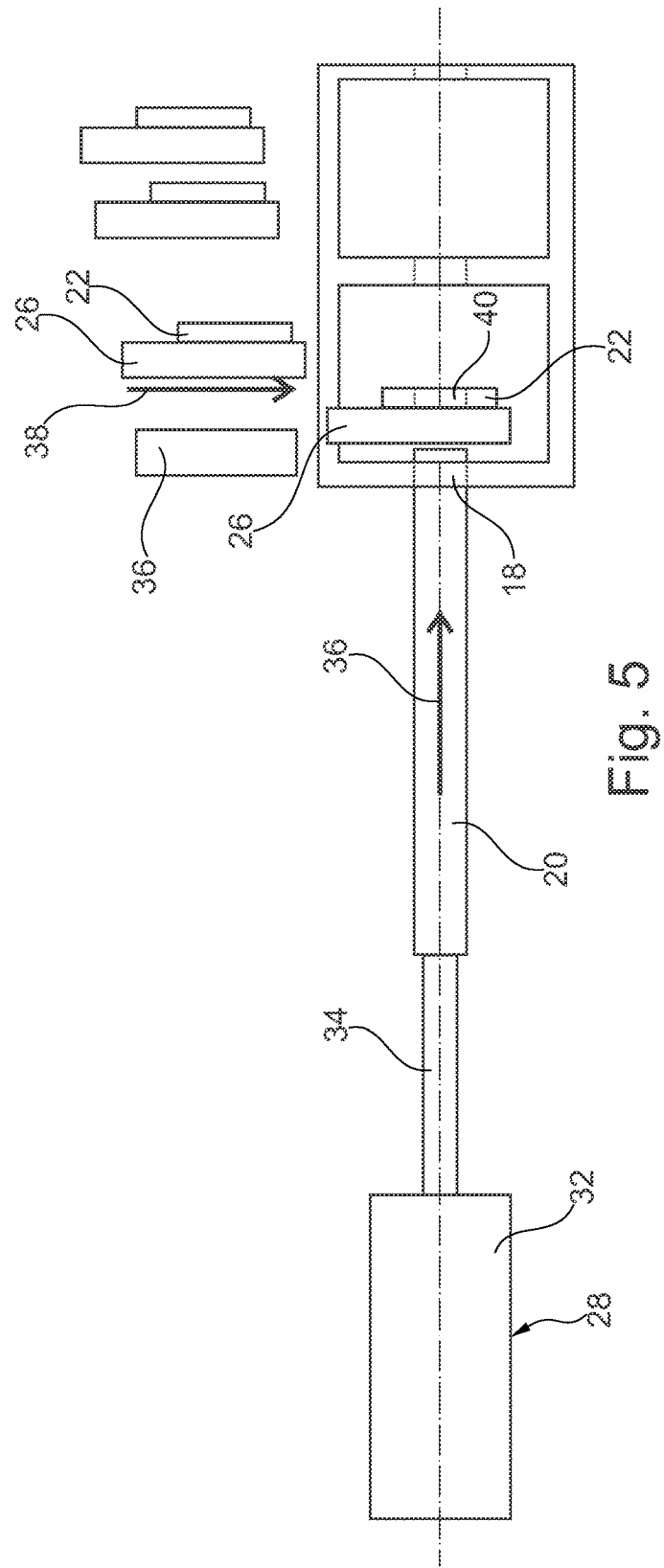

The next stage of the method of assembling the composite housing is shown in FIG. 5. The first element 22 has been located in its predetermined position within the housing 10. In this position, locating tool 26 engages with positioning lugs on the inner surface of the housing 10 (not shown) in order to retain it in position when subjected to loads in the direction of arrow 36. As the shaft 20 is forced further through the bearing 18 towards a position in which it will engage an opening 40 in element 22, the second locating tool 26 associated with the second element 22 to be mounted on the shaft 20 moves it from the ready position of FIG. 5 adjacent its associated heat source 36 in the direction of arrow 38 towards its predetermined position within the housing 10.

Figure 6:
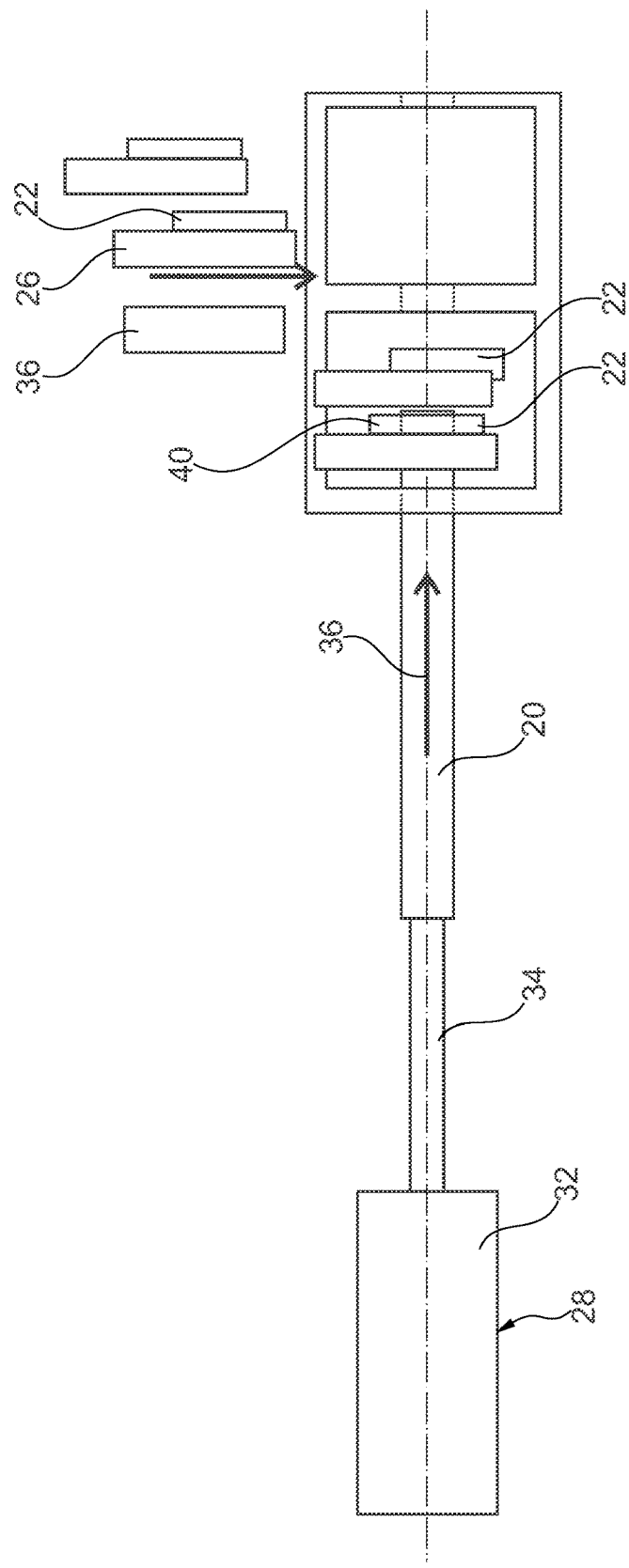

As shown in FIG. 6, the shaft 20 has been driven through the opening 40 of the first element 22 and is about to engage a similar opening in the second element. At this point, the third locating tool 26 associated with the third element 22 to be mounted on the shaft 20 moves it from the ready position of FIG. 6 adjacent its associated heat source 36 in the direction of arrow 38 towards its predetermined position within the housing 10. As with the previous locating tools, in this position, locating tool 26 engages with positioning lugs on the inner surface of the housing 10 (not shown) in order to retain it in position when subjected to loads in the direction of arrow 36. The other locating tools remain in their located positions in order to maintain their associated element 22 in position while the shaft 20 continues to advance through the housing.

Figure 7:
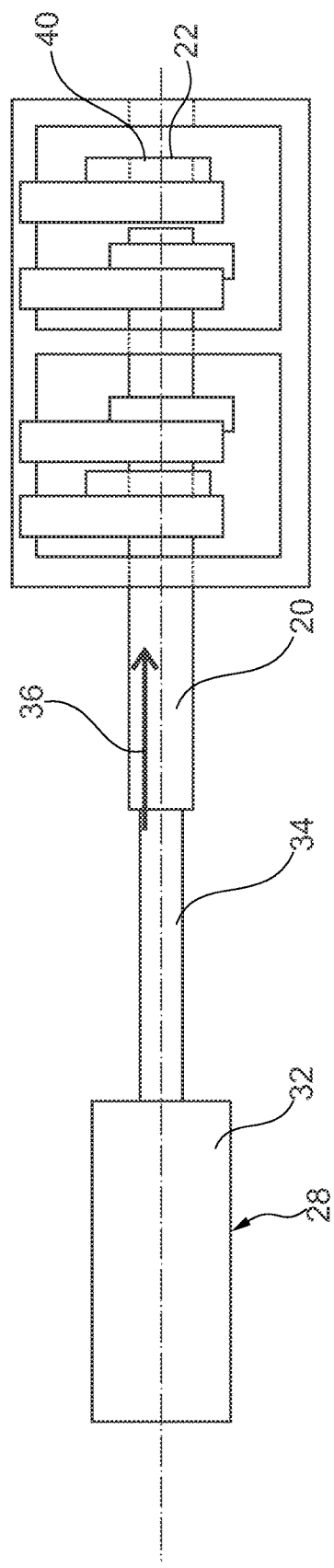

The method of assembling the composite housing continues in a similar manner until it reaches the position shown in FIG. 7. In this position all four elements 22 have been located in their predetermined positions by their respective locating tools 26. Shaft 20 has been driven by piston 34 of actuator 28 in the direction of arrow 36 until it has traversed the first three elements 22 and is about to engage the opening 40 of the final element 22.

Figure 8:
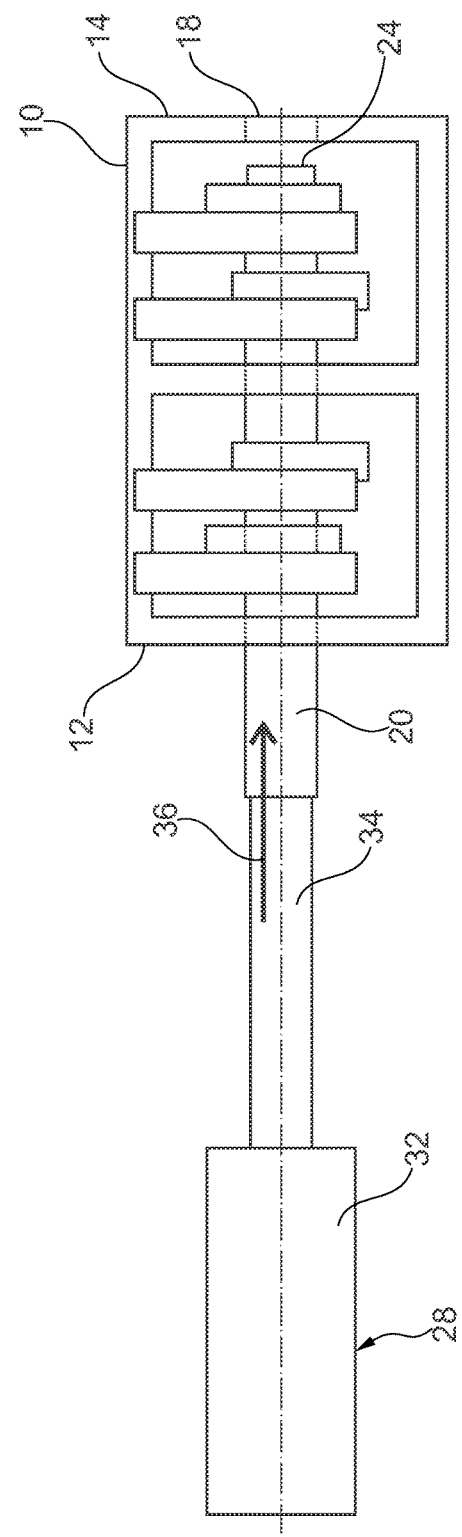

In FIG. 8 is shown the position of the shaft 20 once it has been driven through the openings 40 in all the elements 22 in their predetermined positions inside the housing 10. The end 24 of shaft 20 is about to engage with the interior of the final bearing 18 located in end wall 14 of housing 10.

Figure 9:
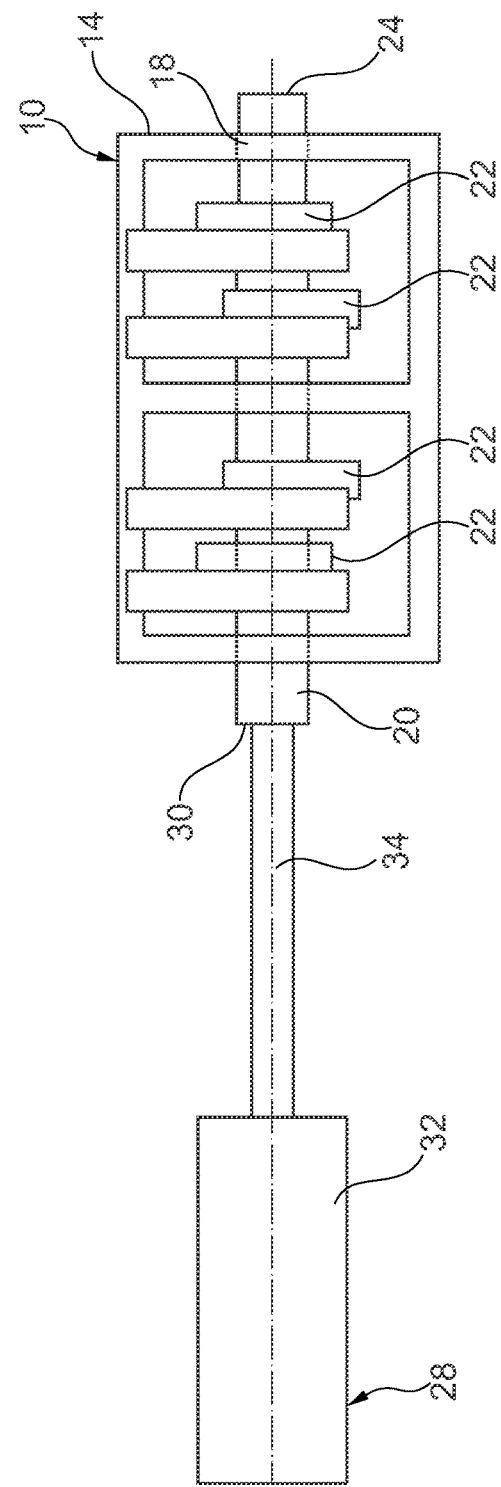

The final position of the shaft 20 is shown in FIG. 9. In this position, the end 24 of shaft 20 has been driven by the actuator 28 through the bearing 18 in end wall 14 of the housing 10 and a predetermined distance beyond the end of wall 14. In this position, end 30 of shaft 20 projects a generally equal distance beyond end wall 12 of housing 10 in a similar way to that shown in FIG. 1. In this position, additional components, for example, drive wheels or balancing elements (not shown) can be mounted on the free ends 24 and 30 of the shaft 20. Once the position illustrated in FIG. 9 has been reached, the locating tools 26 can be removed and the completed housing can be conveyed to a subsequent assembly point.

From the position of the housing, the actuator and the shaft shown in FIG. 2 to that shown in FIG. 9, the shaft 20 is in continuous movement. The actuator is arranged to advance the shaft, preferably at a constant speed, and the locating tools 26 are controlled so that they deliver their associated elements 22 in such a way and at such a time that they are in position within the housing 10 when the end 24 of the shaft 20 reaches them.

At the end of the assembly process, the shaft has reached a pre-determined position with respect to the housing and the completed housing is left immobile for a predetermined time in order to allow the various components to cool and so become fixed in their positions on the shaft.

It is further envisaged that the bearings 18 in the walls 12, 14 and 16 of the housing 10 be heated immediately prior to the commencement of the assembly process in order to facilitate the passage of the shaft 20.

The speed of advance of the actuator and the shaft 20 is optimized as a function of the delivery of the elements 22 by their associated locating tools 26: the shorter the time required to locate each element 22 in its predetermined position, the faster the speed of advance of the shaft. Clearly, a high speed of advance of the shaft 20 is desirable as it will ensure that the bearings 18, if heated, and the elements 22 will remain at a high temperature throughout the assembly process, thus facilitating the advance of the shaft therethrough.

Preferably, the locating tools 26 adapted to select an associated element are positioned in a predetermined, non-aligned position relative to each other before conveying the associated elements into their predetermined positions.

The invention claimed is:

1. A method for assembling a composite housing fitted with a shaft and at least one associated mounted element, comprising the steps of:
    a) arranging the housing in a predetermined position with respect to an actuator, the housing having at least one opening configured to receive a shaft;
    b) arranging the shaft in a predetermined position with respect to the housing and the actuator;
    c) selecting a mounting element to be mounted on the shaft within the housing, the mounting element having an opening configured to receive the shaft;
    d) conveying the mounting element into a predetermined position within the housing;
    e) pushing the shaft via the actuator so that the shaft passes successively through the opening in the housing and the opening in the mounting element to be mounted;
    wherein the method further comprises the steps of:
    f) subsequent to selecting the mounting element to be mounted on the shaft within the housing according to step c), and prior to conveying the mounting element into a predetermined position within the housing according to step d), further including positioning the mounting element in a position adjacent to a heat source for a predetermined duration;
    g) subsequent to pushing the shaft via the actuator so that the shaft passes successively through the opening in the housing and the opening in the mounting element to be mounted according to step e), selecting at least one additional mounting element and conveying the at least one additional mounting element into a predetermined position within the housing, the at least one additional mounting element having an opening configured to receive the shaft, and wherein subsequent to selecting the at least one additional mounting element, and prior to conveying the at least one additional mounting element into a predetermined position within the housing, further including positioning the at least one additional mounting element in a position adjacent a heat source for a predetermined duration; and
    h) pushing the shaft via the actuator so that the shaft passes through the opening in the at least one additional mounting element to be mounted.

2. The method as claimed in claim 1, wherein the selected mounting element is heated to a predetermined temperature prior to conveying the selected mounting element into the predetermined position.

3. The method as claimed in claim 1, wherein the selected mounting element is heated by an induction coil.

4. The method as claimed in claim 2, wherein the selected mounting element is heated in a separate oven.

5. The method as claimed in claim 1, wherein step h) further includes pushing an end of shaft to a predetermined position with respect to the housing after the shaft passes the opening in the at least one additional mounting element to be mounted and holding the shaft in the predetermined position for a predetermined duration.

6. A device for assembling a composite housing fitted with a shaft and at least one associated mounted element, comprising:
   a support for receiving the housing, the housing having at least one opening configured to receive a shaft;
   an actuator for pushing the shaft through the at least one opening of the housing;
   at least one locating tool structured and arranged to select an associated mounting element to be mounted on the shaft and convey the associated mounting element to a first predetermined position within the housing;
   at least one additional locating tool structured and arranged to select an additional associated mounting element to be mounted on the shaft and convey the additional associated mounting element to a second predetermined position within the housing that is disposed axially spaced apart from the first predetermined position; and
   wherein the at least one additional locating tool is moveable with respect to the at least one locating tool when the actuator is operated to push the shaft.

7. The device as claimed in claim 6, wherein each of the locating tools are positioned in a predetermined, non-aligned position relative to each other before conveying each of the associated elements into the respective predetermined positions.

8. The device as claimed in claim 6, further comprising a heat source associated with at least one of the mounting element and the additional mounting element to be mounted on the shaft, the heat source being arranged outside the housing and at predetermined position relative to the housing.

9. The device as claimed in claim 8, wherein the heat source is an induction coil.

10. The device as claimed in claim 8, wherein the heat source is a separate oven.

11. The method as claimed in claim 1, further comprising equipping an internal combustion engine with the assembled composite housing.

12. The method as claimed in claim 1, wherein the selected at least one additional mounting element is heated to a predetermined temperature prior to conveying the selected at least one additional mounting element into the predetermined position.

13. The method as claimed in claim 12, wherein the selected at least one additional mounting element is heated by an induction coil or in a separate oven.

14. A method for assembling a composite housing fitted with a shaft and at least one associated mounting element, comprising the steps of:
   a) arranging the housing in a predetermined position with respect to an actuator, the housing having an opening configured to receive a shaft;
   b) arranging the shaft in a predetermined position with respect to the housing and the actuator;
   c) selecting a first mounting element to be mounted on the shaft within the housing, the first mounting element having an opening configured to receive the shaft;
   d) conveying the first mounting element into a first predetermined position within the housing;
   e) pushing the shaft via the actuator so that the shaft passes successively through the opening in the housing and the opening in the first mounting element to be mounted;
   wherein the method further comprises the steps of:
   f) subsequent to selecting the first mounting element to be mounted on the shaft within the housing, and prior to conveying the first mounting element into a predetermined position within the housing, further including positioning the first mounting element in a position adjacent to a heat source and heating the first mounting element to a predetermined temperature for a predetermined duration;
   g) selecting a second mounting element to be mounted on the shaft and conveying the second mounting element into a second predetermined position within the housing subsequent to pushing the shaft via the actuator so that the shaft passes successively through the opening in the housing and the opening in the first mounting element to be mounted, the second mounting element having an opening configured to receive the shaft, and wherein subsequent to selecting the second mounting element to be mounted on the shaft within the housing, and prior to conveying the second mounting element into a second predetermined position within the housing, further including positioning the second mounting element in a position adjacent a heat source and heating the second mounting element to a predetermined temperature for a predetermined duration; and
   h) pushing the shaft via the actuator so that the shaft passes through the opening in the second mounting element to be mounted;
   wherein the second mounting element is conveyed into the second predetermined position after the shaft passes through the opening in the first mounting element and advances further through the housing past the first mounting element.

15. The method as claimed in claim 1, wherein step g) includes selecting a second additional mounting element, and wherein step h) is completed for the at least one additional mounting element before conveying the second additional mounting element into a predetermined position within the housing according to step g).

16. The method as claimed in claim 1, wherein at least two additional mounting elements are selected in step g), wherein steps g) and h) are performed progressively such that the at least two additional mounting elements are selected and conveyed into a respective predetermined position progressively according to step g) while the shaft is pushed via the actuator progressively through a respective opening of the at least two additional mounting elements according to step h).

17. The method as claimed in claim 1, wherein step d) of conveying the mounting element into a predetermined position within the housing includes holding the mounting element via a locating tool engaged with the housing to retain the mounting element in the predetermined position as the shaft advances through the housing and passes through the opening in the mounting element.

18. The device as claimed in claim 6, wherein the at least one locating tool and the at least one additional locating tool are moveable one after the other.

19. The device as claimed in claim 18, wherein the at least one additional locating tool is structured and arranged to move the additional associated mounting element to the second predetermined position after the at least one locating tool is arranged in the first predetermined position.

20. The device as claimed in claim 6, wherein at least one of:
- the at least one locating tool is structured and arranged to engage with the housing in the first predetermined position and retain the associated mounting element in the first predetermined position as the actuator drives the shaft through an opening in the associated mounting element; and
- the at least one additional locating tool is structured and arranged to engage with the housing in the second predetermined position and retain the additional associated mounting element in the second predetermined position as the actuator drives the shaft through an opening in the additional associated mounting element.

* * * * *